United States Patent
Kovarik et al.

(10) Patent No.: US 7,020,717 B1
(45) Date of Patent: Mar. 28, 2006

(54) SYSTEM AND METHOD FOR RESYNCHRONIZING INTERPROCESS COMMUNICATIONS CONNECTION BETWEEN CONSUMER AND PUBLISHER APPLICATIONS BY USING A SHARED STATE MEMORY AMONG MESSAGE TOPIC SERVER AND MESSAGE ROUTERS

(75) Inventors: Vincent Kovarik, Melbourne, FL (US); Eric Held, Melbourne, FL (US)

(73) Assignee: Harris-Exigent, Inc., Melbourne, FL (US)

( * ) Notice: Subject to any disclaimer, the term of this patent is extended or adjusted under 35 U.S.C. 154(b) by 757 days.

(21) Appl. No.: 09/677,072

(22) Filed: Sep. 29, 2000

Related U.S. Application Data (60) Provisional application No. 60/156,605, filed on Sep. 29, 1999.

(51) Int. Cl.
*G06F 15/173* (2006.01)

(52) U.S. Cl. ............... 709/238; 709/213; 709/219; 709/225; 709/227; 709/232; 709/203; 714/43; 707/10

(58) Field of Classification Search ........ 709/201–203, 709/225–227, 238, 213, 217, 219, 223, 229, 709/232; 700/128; 714/43; 707/10
See application file for complete search history.

(56) References Cited

U.S. PATENT DOCUMENTS

| | | | |
|---|---|---|---|
| 5,319,774 A | 6/1994 | Ainsworth et al. | |
| 5,390,326 A | 2/1995 | Shah | |
| 5,887,127 A | 3/1999 | Saito et al. | |
| 5,941,955 A | 8/1999 | Wilby et al. | |
| 6,052,730 A * | 4/2000 | Felciano et al. | 709/225 |
| 6,070,191 A * | 5/2000 | Narendran et al. | 709/226 |
| 6,202,093 B1 * | 3/2001 | Bolam et al. | 709/225 |
| 6,298,455 B1 * | 10/2001 | Knapman et al. | 714/43 |
| 6,334,151 B1 * | 12/2001 | Bolam et al. | 709/225 |
| 6,349,307 B1 * | 2/2002 | Chen | 707/103 X |
| 6,366,826 B1 * | 4/2002 | Mead et al. | 700/128 |
| 6,400,681 B1 * | 6/2002 | Bertin et al. | 370/218 |
| 6,487,678 B1 * | 11/2002 | Briskey et al. | 714/4 |
| 6,507,863 B1 * | 1/2003 | Novaes | 709/201 |
| 6,643,682 B1 * | 11/2003 | Todd et al. | 709/202 |
| 6,662,206 B1 * | 12/2003 | Banavar et al. | 709/201 |

OTHER PUBLICATIONS

S. Deering, *Internet Engineering Task Force, Host Extensions for IP Multicasting*, (Aug. 1989) <http://www.faqs.org/rfcs/rfc1112.html>.

\* cited by examiner

*Primary Examiner*—Philip Tran
*Assistant Examiner*—Oanh Duong
(74) *Attorney, Agent, or Firm*—Sacco & Associates,PA (57) ABSTRACT

A distributed messaging method for publishing topical data messages in a communications network can include the steps of receiving in a first message router from a data consumer a request to subscribe to a message topic; responsive to receiving the subscription request, retrieving from a message topic server a location of a second message router communicatively linked to a data publisher able to provide data messages consonant with the requested message topic; establishing an interprocess communications connection between the first and second message routers; and, transmitting data messages from the data publisher over the established interprocess communications link to the data consumer.

15 Claims, 9 Drawing Sheets

SYSTEM AND METHOD FOR RESYNCHRONIZING INTERPROCESS COMMUNICATIONS CONNECTION BETWEEN CONSUMER AND PUBLISHER APPLICATIONS BY USING A SHARED STATE MEMORY AMONG MESSAGE TOPIC SERVER AND MESSAGE ROUTERS

CROSS REFERENCE TO RELATED APPLICATIONS

This Application claims the priority of U.S. provisional patent application No. 60/156,605 filed Sep. 29, 1999.

BACKGROUND OF THE INVENTION

1. Technical Field

This invention relates to the field of distributed messaging and more particularly to a distributed messaging system for transmitting topical data messages from data publishers to data consumers.

2. Description of the Related Art

Conventional distributed computing can require that multiple computer application processes share data over a computer communications network. Specifically, distributed computer applications can require that processes running in one computing device share data with one or more processes running in other computing devices communicatively connected to one another in a computer communications network. Communications between distributed applications can require significant coordination and control in order to ensure that data which is received is correct and accurate. Disruption in communications can be catastrophic if the distributed applications cannot adequately detect a break in communications and respond accordingly.

In a typical distributed system there may be hundreds of computers running many application programs. In consequence, sharing data entails not only establishing a means of communication between the application programs across a network but also providing the capability to recover from failures. These failures may be due to physical network problems, software problems, or other error conditions. Recovering from a fault or problem is a critical issue in the arena of distributed computing.

The problem of communications disruption in distributed computing has been addressed in U.S. Pat. No. 5,887,127 for Self-Healing Network Initiating Fault Restoration Activities from Nodes at Successively Delayed Instants issued on Mar. 23, 1999 to Saito et al., and in U.S. Pat. No. 5,390,326 for Local Area Network with Fault Detection and Recovery issued on Feb. 14, 1995 to Shah. Both Shah and Saito illustrate how previous work in providing resiliency in communications between processes has focused on the underlying communications network. Specifically, Shah teaches the generation and transmission of a heartbeat signal from various nodes in a network in order to monitor the network for the occurrence of a fault. In contrast, Saito is directed towards coordinating fault recovery among several nodes in a network. In particular, Saito provides for time-staggered fault recovery among the various nodes in a network. Additionally, U.S. Pat. No. 5,319,774 for Recovery Facility for Incomplete Sync Points for Distributed Application issued on Jun. 7, 1994 to Ainsworth et al. focuses on the re-synchronization of database files across disparate operating environments subsequent to the occurrence of a communications fault.

Still, neither Shah, Saito, nor Ainsworth teach a distributed messaging system capable of recovering and re-synchronizing interprocess communications between data publishers and data consumers in a distributed messaging system. Yet, distributed applications are increasingly utilizing asynchronous communications, typically in the form of messages between processes, as the means for sharing data and providing notification of events between application processes. In the event of a loss of communications, either through network failure or the failure of one of the communicating processes, messages may be lost which can adversely affect the correct operation of the distributed system. Problems arise when attempting to restore communications between two applications in a distributed system because the processes involved in the communications must re-synchronize the message flow between them. This requires significant information to be maintained by each process involved in sending or receiving messages.

SUMMARY OF THE INVENTION

A distributed messaging system for transmitting topical data messages from data publishers to data consumers in accordance with the inventive arrangements satisfies the long-felt need of the prior art by defining a method for re-synchronization of message traffic between multiple processes across multiple computers. A distributed messaging system for transmitting topical data messages from data publishers to data consumers can include a message topic server; a plurality of message routers; and, a plurality of message adapters. Each data publisher can be communicatively linked to a message adapter, each data consumer can be communicatively linked to a message adapter, each message adapter can be communicatively linked to a message router, and each message router can be communicatively linked to the message topic server.

The message topic server can have a list of message topics to which data consumers can subscribe and a list of data publishers able to publish data messages consonant with the message topics. The message routers can subscribe to selected message topics in the list in the message topic server on behalf of requesting data consumers. The message routers also can register message topics with the message topic server on behalf of requesting data publishers which publish data messages consonant with the registered message topics. Moreover, the message routers can transmit and receive data messages to and from respective data consumers and data publishers according to the subscriptions. Finally, the transmitted and received data messages can be transmitted and received to and from the respective data consumers and data publishers through message adapters which are communicatively linked to the respective data consumers and data producers.

The present invention can include a distributed messaging method for publishing topical data messages in a communications network comprising. The method of the invention can include the steps of receiving in a first message router from a data consumer a request to subscribe to a message topic; responsive to receiving the subscription request, retrieving from a message topic server a location of a second message router communicatively linked to a data publisher able to provide data messages consonant with the requested message topic; establishing an interprocess communications connection between the first and second message routers; and, transmitting data messages from the data publisher over the established interprocess communications link to the data consumer.

Notably, the step of establishing an interprocess communications connection can include establishing a multicast data communications link between the first and second message routers. Accordingly, the transmitting step can include multicasting data messages from the data publisher over the multicast data communications link to the data consumer.

The method of the invention also can include detecting a communications interruption. In one aspect of the invention, the step of detecting can include detecting a communications break between the data publisher and the second router. In another aspect of the invention, the step of detecting can include detecting a communications break between the first and second routers. Finally, in yet another aspect of the invention, the detecting step can include detecting the data publisher terminating publication of the requested message topic.

Responsive to detecting the interruption, the method can include the steps of terminating the subscription, retrieving from the message topic server a location of a message router communicatively linked to a data publisher able to resume the providing of the data messages consonant with the requested message topic, establishing an interprocess communications connection between the first message router and the message router communicatively linked to a data publisher able to resume the providing of the data messages, and resuming the transmission of the data messages from the data publisher over the established interprocess communications connection between the first message router and the message router communicatively linked to a data publisher able to resume the providing of the data messages. Notably, the step of establishing an interprocess communications connection between the first message router and the message router communicatively linked to a data publisher able to resume the providing of the data messages can include re-establishing an interprocess communications connection between the first and second message routers.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
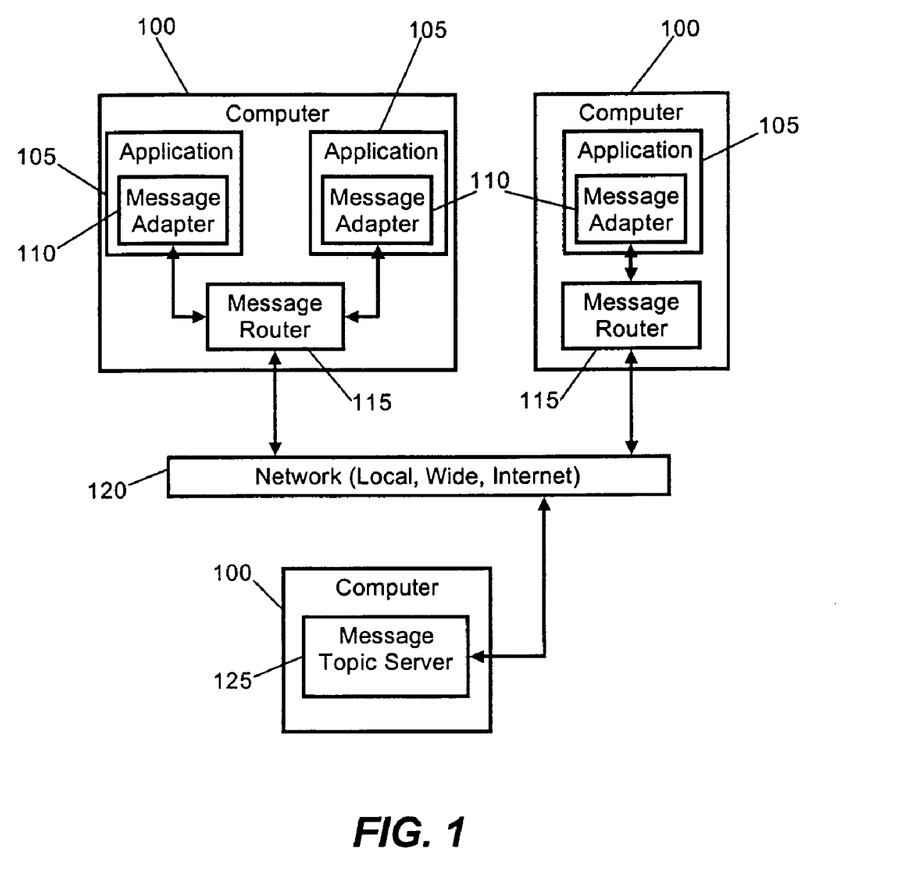
FIG. 1 is a schematic diagram of three network messaging components which can form a distributed messaging system for transmitting topical messages from data publishers to data consumers.

The present invention is a distributed messaging system for transmitting topical messages from data publishers to data consumers. By virtue of the architecture of the present invention, the system and method of the present invention can re-synchronize interprocess communications between data publishers and data consumers in a distributed messaging system. More particularly, as shown in FIG. 1, the system of the invention can include a message topic server 125; a plurality of message routers 115; and, a plurality of message adapters 110, distributed across several computing devices 100 in a computer communications network 120.

The message adapters 110 can be communicatively linked to an application 105. The communications link which communicatively links applications 105 to message adapters 110 can be any suitable communicative link including, but not limited reliable point-to-point communications, for example TCP/IP. Alternatively, the message adapter 110 can be included as an embedded component of the application 110, for example as an additional module.

In accordance with the present invention, an application 105 can be one of a data consumer or a data publisher each executing in a computing device 100. More particularly, data consumers consume and process data messages published by data publishers. Conversely, data publishers can publish data messages for consumption by data consumers. For ease of illustration, FIG. 1 depicts three applications 105 any of which can be data consumers or data publishers.

Data publishers can be communicatively linked to corresponding message adapters 110 executing in the same computing device 100. Similarly, data consumers can be communicatively linked to message adapters 110 executing in the same computing device 100. Notably, each message adapter 110 can be communicatively linked to a message router 115, typically executing in the same computing device 100. Moreover, each message router 115 can be communicatively linked to a message topic server 125, typically executing in another computing device 100.

Notably, in all cases where one component of the present invention is communicatively linked to another, any suitable communications link can suffice including a reliable TCP/IP connection or an unreliable UDP/IP connection. Moreover, the invention is not limited to the circumstance where each application 105, corresponding message adapter 110 and message router 115 reside in the same computing device. Rather, in a purely distributed system, each of the application 105, corresponding message adapter 100 and message router 115 can reside and execute in different computing devices. Conversely, the message topic server 125 is not limited to executing in a computing device separate from those computing devices in which the message routers 115 also reside and execute. Rather, the message topic server 125 can reside in the same computing devices as those of the message routers 115 and message adapters 110.

Finally, the computing devices 100 can be any suitable computing apparatus which can generally include a central processing unit (CPU), memory and fixed storage. More particularly, the computing devices 100 can include a fixed storage for storing computer instructions and data such as applications 105, message adapters 110, message routers 115 and message topic servers 125. The computing devices 100 also can include memory in which the instructions and data can be loaded at run-time. Finally, the computing devices 100 can include a CPU which can include an instruction set for performing the instructions and processing the data. Optionally, the computing devices 100 can include input ports, such as a serial communications port, wireless port or a port, and output ports, such as a serial communications port, wireless port or a video port. Examples of the computing devices 100 can include conventional computers, embedded systems, and handheld devices such as personal digital assistants and intelligent cellular phones.

Returning now to FIG. 1, the message topic server 125 can have a list of message topics to which data consumers can subscribe and a list of data publishers able to publish data messages consonant with the message topics. Message topics can be any suitable categorization of data messages and need not follow any particular format. For example, suitable message topics can include "Battery Level", "Printer #2", "Outside Temperature", "Current Stock Indices", etc. Data publishers can register message topics with the message topic server 125. In consequence, data consumers can subscribe to those message topics registered by the data publishers.

By registering a message topic, a data publisher can provide data messages consonant with the message topic to those data consumers who choose to subscribe to the registered message topic. Thus, for example, a data publisher who registers the message topic "Printer #2" can publish data messages to those data consumers who have subscribed to the message topic "Printer #2". Generally, those data messages published by the registrar of a message topics are consonant with the message topic. Thus, the data publisher of the message topic "Printer #2" can publish data messages relating to the state of Printer #2, for instance a "paper out" message or a "print job complete" message. Of course, just as data publishers can register message topics, data publishers also can unregister message topics when the data publisher no longer will publish data messages consonant with the unregistered message topic.

The message topic server 125 not only can maintain a master list of all message topics currently available for subscription, but also the message topic server 125 can maintain a master list of all message topics for which data consumers have requested a subscription, but have not yet been registered by a data publisher. Accordingly, when a message topic is registered which matches a message topic previously requested by a data consumer, the data consumer can be notified of the message topic registration. Finally, the message topic server 125 can maintain a state table for tracking those message routers 115 through which data messages associated with registered message topics are transmitted to and received from respective data consumers and data producers.

The message adapter 110 primarily can be used to transmit and receive data messages on behalf of a host application 105. More particularly, the message adapter 110 can be an interface to the distributed messaging system of the present invention.

Applications 105 which participate in the distributed messaging system need only interact with the interface provided by the message adapters 110. In consequence, applications 105 need not be modified each time the architecture of the distributed messaging system changes.

In operation, where the host application 105 is a data consumer, the message adapter 110 can receive data messages from the network 120 and provide the same to the data consumer. Conversely, where the host application 105 is a data publisher, the message adapter 110 can receive data messages from the data publisher and transmit the same over the network 120. Additionally, the message adapter 110 can maintain state information regarding the host application 105. For example, where the host application 105 is a data consumer, the message adapter 110 can track the message topics to which the data consumer has subscribed. Similarly, where the host application 105 is a data publisher, the message adapter 110 can track the message topics which the data producer has registered with the message topic server 120.

The message router 115 is a service application which can execute in a computing device 100 which also contains various applications 105 communicatively linked to corresponding message adapters 110. The message router 115 can service application requests to transmit and receive data messages. In addition, the message router 115 can service application requests to register and unregister message topics. Finally, the message router 115 can service application requests to subscribe to and unsubscribe from selected message topics.

Notably, the message router 115 can track those message topics for which communicatively linked data consumers have subscriptions. Likewise, the message router 115 can track those message topics which communicatively linked data publishers have registered in the message topic server 125. Finally, the message router 115 can maintain a state table of interprocess communications links to other message routers 115 in other computing devices 100. Significantly, by maintaining both a table of links to corresponding applications 105 and a state table of interprocess communications links to other message routers 115 in other computing devices 100, the message routers 115 can track the state of existing communications links and can detect faults in those communications links. Responsive to detecting a fault, the message routers 115 can attempt to reestablish any broken communications links with corresponding applications 105 and other message routers 115.

Figure 2:
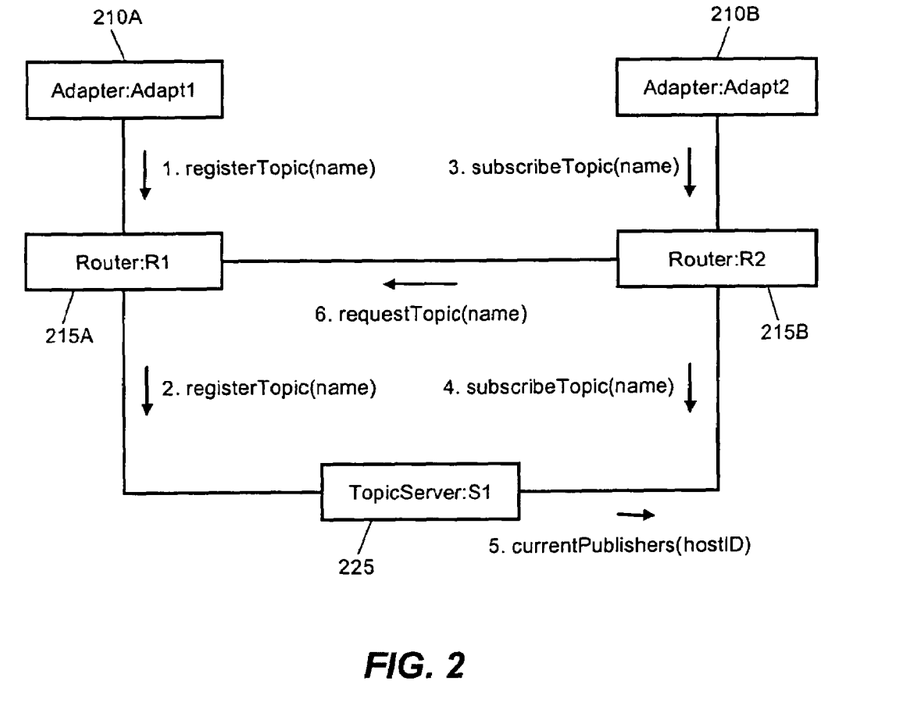
FIG. 2 is an object relationship diagram showing message-oriented middleware topic registration and subscription typical during nominal operation of the system of the invention.

FIG. 2 is an operational flow diagram illustrating a process of distributing data messages in the distributed messaging system of the present invention during nominal conditions. For purposes of illustrating one aspect of the present invention, the distributed messaging system shown in FIG. 2 includes only a message adapter 210A associated with a single data publisher, and a message adapter 210B associated with a single data consumer. One skilled in the art will recognize, however, that the invention is not so limited to the precise arrangement shown in FIG. 2. Rather, it is an advantage of the present invention that multiple message adapters associated with a multiplicity of data publishers and data consumers can be integrated into the architecture of the present invention.

As shown in FIG. 2, during nominal operating conditions, initially a first message adapter 210A can register a message topic with the message topic server 225 by transmitting a registerTopic message to the message router 215A. Responsive to receiving the registerTopic message from the message adapter 210A, the message router 215A can transmit a registerTopic message to the message topic server 225. In consequence, the message topic server 225 can add the message topic to a list of message topics available for subscription by data consumers. Additionally, the message topic server 225 can associate the message router 215A with the message topic and can add the message router 215A to a table of message routers with whom the message topic server 225 presently maintains a communications link.

Significantly, the message adapter 210A need not and, in fact, does not have an awareness of the message topic server 225. Rather, the message adapter 210A only communicates with its associated message router 215A. As a result, the message adapter 210A need not respond to an operational failure in the message topic server 225. Rather, only the message adapter's 210A associated message router 215A can respond to a fault in communications with the message topic server 225.

During nominal operations, data consumers can subscribe to message topics which have been published by data publishers. Specifically, as shown in FIG. 2, at the behest of an associated data consumer, a message adapter 210B can transmit to an associated message router 215B a subscribeTopic request for a subscription to a particular message topic. The message router 215B can receive the request and, in response, can transmit to the message topic server 225 a subscribeTopic request.

In consequence, the message topic server 225 can add the message router 215B to a list of message routers who have subscribed to the particular message topic. Additionally, the message topic server 225 can add the message router 215B to a table of message routers with whom the message topic server 225 presently maintains a communications link. Finally, the message topic server 225 can respond to the subscribeTopic request by transmitting to the message router 215B a currentPublishers message containing a host identification of a message router from which the requesting data consumer can receive data messages consonant with the requested message topic. The message topic server 225 can retrieve the host identification number from the list of message routers who have registered message topics in the message topic server 225. Specifically, the message topic server 225 can search the list for the requested topic and can identify therein the host identification of a message router associated with the requested topic. In the example shown in FIG. 2, the host identification number provides the message router 215B with a reference to the message router 215A.

Like the message adapter 210A, the message adapter 210B need not and, in fact, does not have an awareness of the message topic server 225. Rather, the message adapter 210B only communicates with its associated message router 215B. As a result, the message adapter 210B need not respond to an operational failure in the message topic server 225. Rather, only the message adapter's 210B associated message router 215B can respond to a fault in communications with the message topic server 225.

Notably, upon receiving the host identification number of the message router 215A, the message router 215B can establish an interprocess communications link with the message router 215A. Subsequently, the message router 215B can transmit a requestTopic message identifying the subscribed message topic to the message router 215A. The message router 215A can receive the requestTopic message and can determine which of its associated message adapters has registered on behalf of a data publisher the requested message topic in the message topic server 225. Subsequently, the message router 215A can transmit data messages consonant with the requested message topic over the interprocess communications link to the message router 215B. The message router 215B, in turn, can forward the data messages received from the message router 215A to the originally subscribing data consumer through the message adaptor 210B.

As shown in FIG. 2 and subsequent figures, the various messages transmitted between the network components are numbered so as to indicate some order as to the transmission of the messages. Notwithstanding, one skilled in the art will recognize that the numbering of the messages does not limit the implementation of each process to the precise ordering shown. Rather, in many cases, messages can be transmitted in a different order without affecting the result of the process. Moreover, as in the case of typical distributed systems, messages can be transmitted concurrently with the transmission of other messages. For example, the message adapter 210B just as well could subscribe to a topic prior to, or concurrently with, the message adapter 210A registering the same topic.

Figure 3:
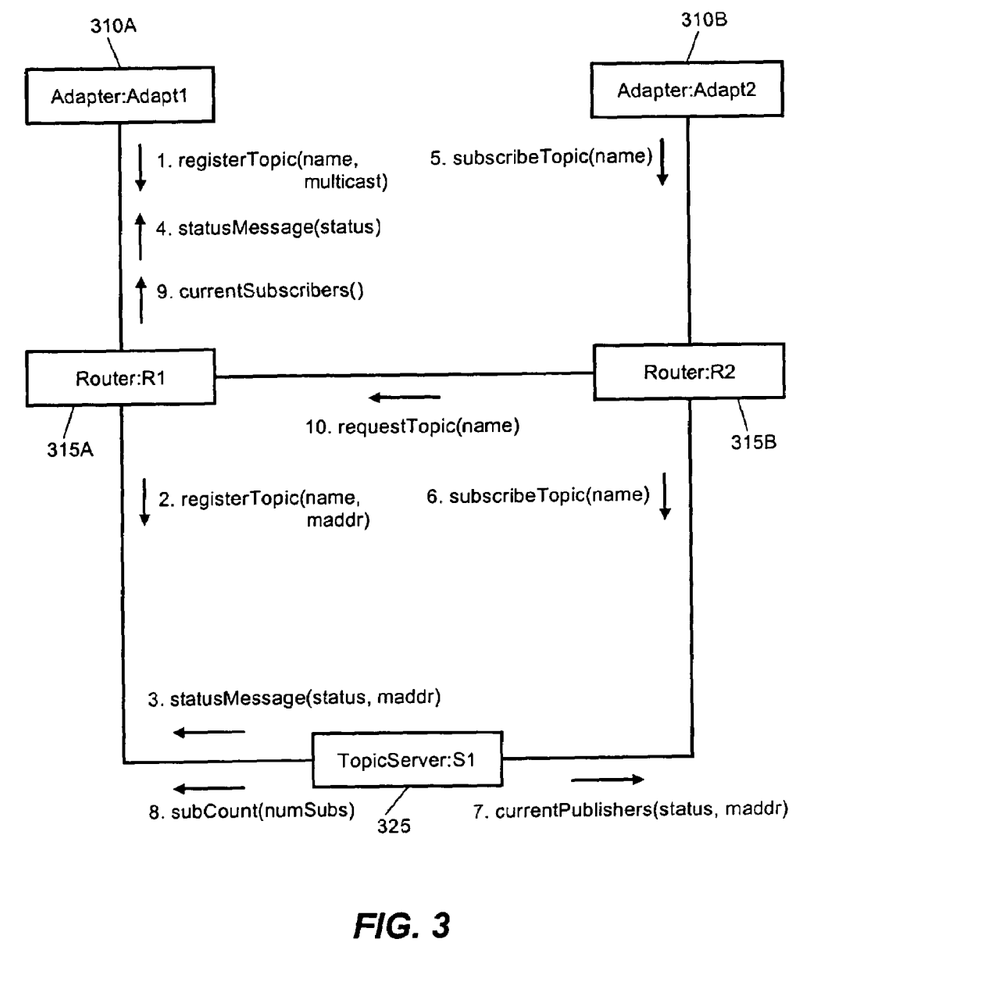
FIG. 3 is an object relationship diagram showing IP multicast topic registration and subscription typical during nominal operation of the system of the invention.

FIG. 3 is an operational flow diagram illustrating a process of distributing data messages in the distributed messaging system of the present invention during nominal conditions as in FIG. 2. However, as will be apparent to one skilled in the art, the distributed messaging system of FIG. 3 transmits data messages from data publishers to data consumers over IP multicast links. Specifically, data publishers can multicast data messages to those data consumer subscribers who have established a connection on an IP multicast port which carries the multicast data.

As is well known in the art, IP multicasting involves the transmission of data to distributed servers on a Multicast Backbone (MBone). For large amounts of data, IP Multicast can be more efficient than conventional point-to-point Internet transmissions because a multicast server can narrowcast a message to many recipients simultaneously. Unlike traditional Internet traffic which can require separate connections for each source-destination pair, IP Multicasting allows many recipients to share the same data source. In consequence, merely one set of data packets need be transmitted for all the destinations. IP Multicasting has been defined as an international standard by the Internet Engineering Task Force in S. E. Deering, Host extensions for IP multicasting (RFC 1112 Aug.-1-1989).

As shown in FIG. 3, during nominal operating conditions, initially a first message adapter 310A can register a message topic with the message topic server 325 by transmitting a registerTopic message to the message router 315A specifying that the data messages should be multicast to the various data consumers. Responsive to receiving the registerTopic message from the message adapter 310A, the message router 315A can transmit a registerTopic message to the message topic server 325 specifying both the message topic name and the multicast channel address upon which data messages relating to the message topic will be transmitted.

In consequence, the message topic server 325 can add the message topic to a list of message topics available for subscription by data consumers. Additionally, the message topic server 325 can associate the message router 315A with the message topic and can add the message router 315A to a table of message routers with whom the message topic server 325 presently maintains a communications link. Finally, the message topic server 325 can return a status message to the message router 315A confirming the registration of the message topic and the current transmission status of the specified multicast channel. The message router 315A, in turn, can forward a status message to the message adaptor confirming reporting the current transmission status of the specified multicast channel.

During nominal operations, data consumers can subscribe to multicast message topics which have been published by data publishers. Specifically, as shown in FIG. 3, at the behest of an associated data consumer, a message adapter 310B can transmit to an associated message router 315B a subscribeTopic request for a subscription to a particular message topic. The message router 315B can receive the request and, in response, can transmit to the message topic server 325 a subscribeTopic request. In consequence, the message topic server 325 can add the message router 315B to a list of message routers who have subscribed to the particular message topic. Additionally, the message topic server 325 can add the message router 315B to a table of message routers with whom the message topic server 325 presently maintains a communications link.

The message topic server 325 can respond to the subscribeTopic request by transmitting to the message router 315B a currentPublishers message containing both an address of the multicast channel and the current status of data message transmission across the multicast channel. Concurrently, the message topic server 325 can notify the message router 315A that a new data consumer has subscribed to the message topic on the multicast data channel. In turn, the message router 315A can confirm the subscriber list of those message routers communicatively linked to the multicast channel specific to the subscribed message topic. Upon receiving the address of the multicast data channel, the message router 315B can establish an IP multicast communications link with the message router 315A. Subsequently, the message router 315B can extract from the multicast channel those data messages pertinent to the subscribed message topic.

Notably, the distributed messaging system of the present invention can utilize a shared state memory which can store both message traffic and network configuration data. More particularly, the three network components (message adaptor, message router and message topic server) can form the shared state memory which can contain data regarding both network message traffic and network configuration. In consequence, the distributed nature of the message traffic and network configuration data can enable the reconstruction and re-synchronization of interprocess communications should the distributed messaging system experience a communications fault with any combination of the three network components.

Significantly, as is apparent in FIGS. 2 and 3, each system component maintains an awareness only of the components to which it is directly communicatively linked. In consequence, client applications are oblivious to the network configuration, message flow, and other client applications with which each may be communicating. As a result, the sphere of influence remains encapsulated in the event of a process failure. For example, if a client process fails, the failure does not affect the state of the client application with which the client process had been communicating because the client application had no direct communications with the failed client process. Similarly, if a message router fails, the failure can affect only those processes to which; the message router had been connected.

Specifically, only the client applications the message router had been servicing, other message routers to which the message router had been connected, and the message topic server can be affected by the message router failure. Despite the failure, however, remaining message routers, message topic servers, and client applications to which the failed message router is not connected are not effected. Moreover, those remaining message routers, message topic servers and client applications can recover from the network failure automatically.

Figure 4:
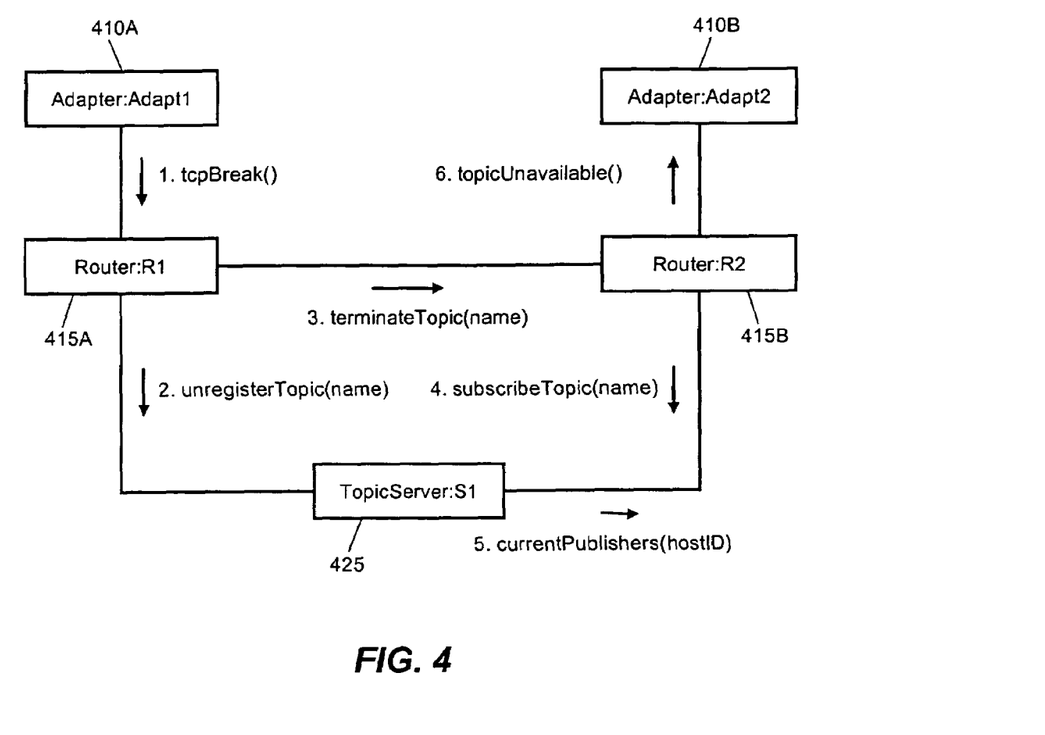
FIG. 4 is an object relationship diagram showing a process for recovery and re-synchronization following a fault in a message adapter.
Figure 5:
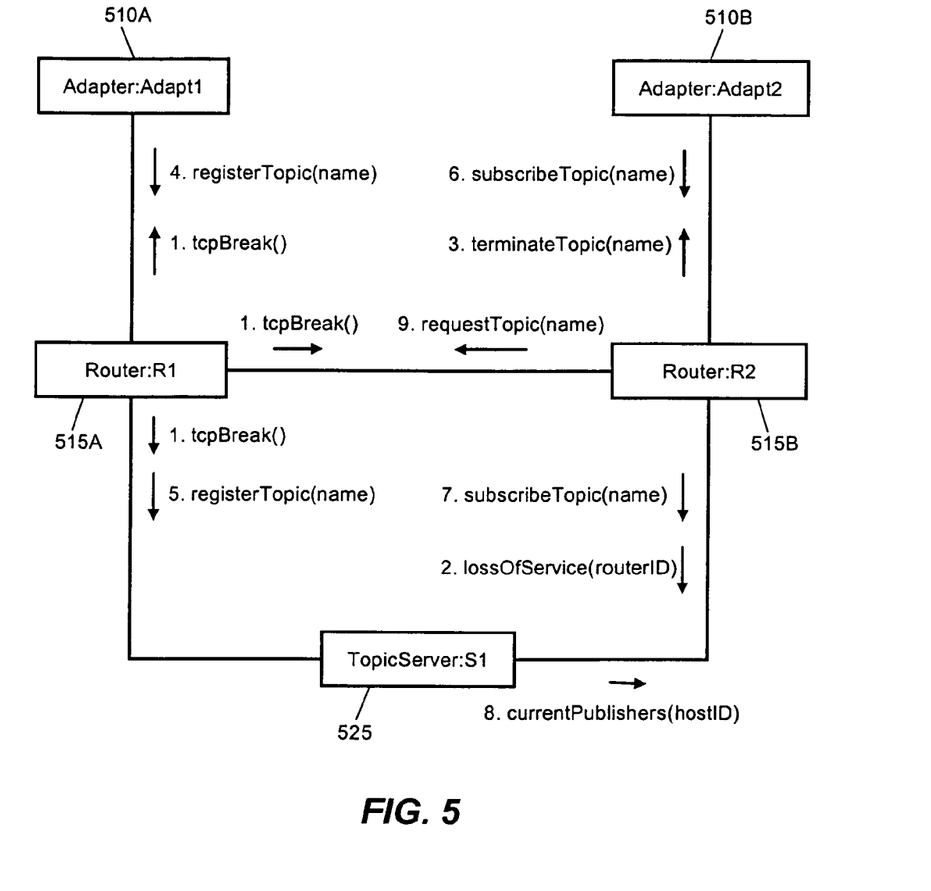
FIG. 5 is an object relationship diagram showing a process for detection, recovery and re-synchronization following a fault in a message router.
Figure 6:
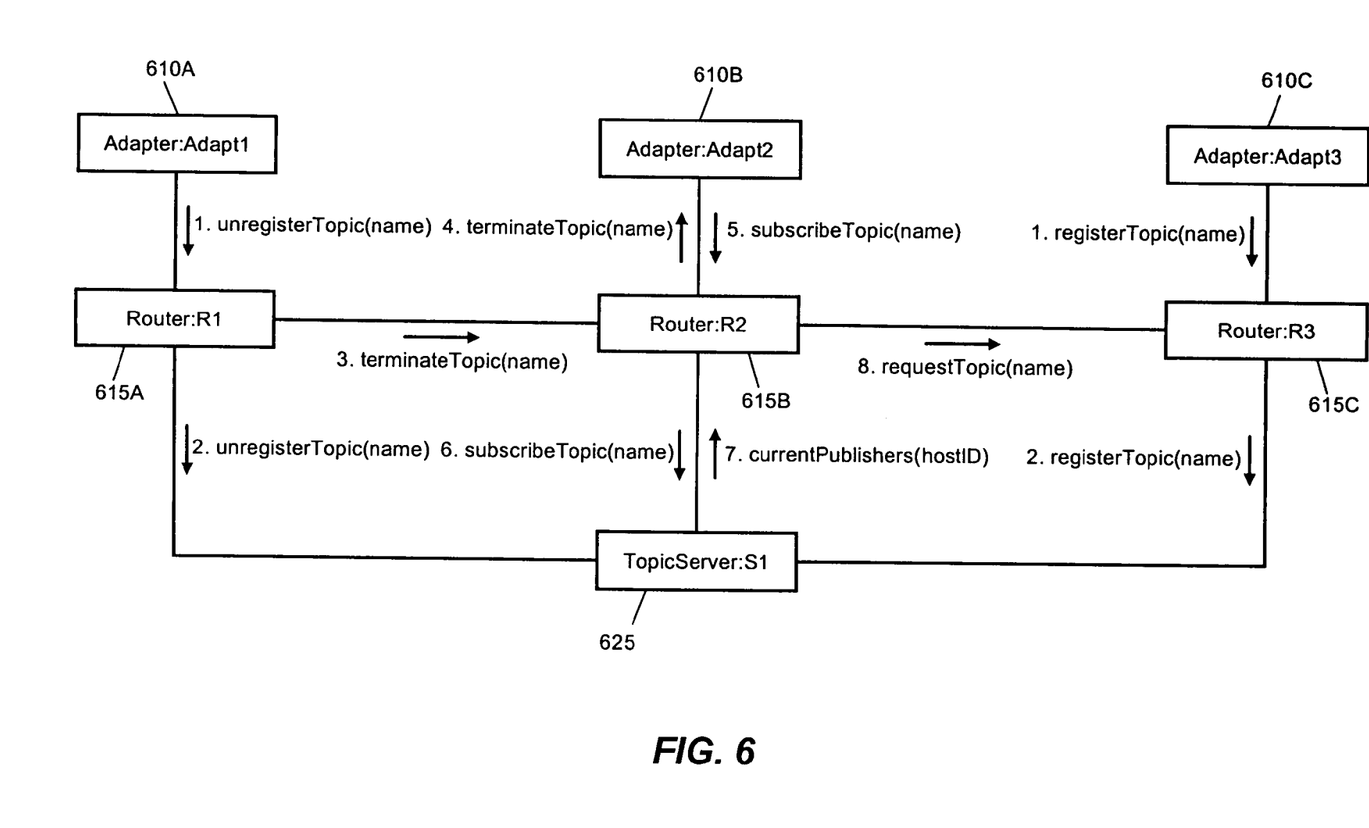
FIG. 6 is an object relationship diagram showing a process for detection, recovery and re-synchronization following a termination of publication by a data publisher.

FIGS. 4–6 are operational flow diagrams illustrating several methods for recovering and re-synchronizing interprocess communications following an interprocess communications fault in the distributed messaging system of the present invention. Significantly, each recovery and re-synchronization process shown in FIGS. 4–6 can be facilitated by the distributed architecture of the present invention. More particularly, the implementation of the three distributed network components—message adapter, message router and message topic server—permits the foregoing recovery and re-synchronization processes which otherwise could not occur in the manner described herein.

FIG. 4 illustrates an exemplary recovery process triggered by the detection of a communications fault in the publication process. As shown in the figure, initially a communications fault in the message adaptor 410A is detected by the message router 415A. In response, the message router 415A both unregisters the message topic published by the data producer associated with the message adaptor 410A and notifies the communicatively linked message router 415B that the transmission of data messages relating to the subscribed message topic have been interrupted.

The message topic server 425, upon receiving an unregisterTopic message, can remove the message topic from the list of message topics available for subscription by data consumers. Upon receiving the terminateTopic message from the message router 415A, the message router 415B can attempt to re-subscribe to the discontinued message topic by transmitting a subscribeTopic message to the message topic server 425. Upon receiving the subscribeTopic message from the message router 415B, the message topic server 425 again can retrieve a host identification number of a suitable message router from the list of message routers who have registered message topics in the message topic server 425. Specifically, the message topic server 425 can search the list for the requested topic and can identify therein the host identification of a message router associated with the requested topic. In the example shown in FIG. 4, the message topic host 425 is unable to find a suitable message router to service the requested subscription. Accordingly, the message router 415B can notify the message adapter 410B that the message topic is no longer available.

FIG. 5 illustrates an exemplary recovery process triggered by the detection of a communications fault in a message router. As shown in the figure, initially each of the message adapter 510A and the message topic server 525 can detect a communications fault in the message router 515A. Additionally, the message router 515B communicatively linked to the message router 515A can detect the communications fault. Upon detecting the communications fault, the message router 515B also can both notify the message topic server 525 and the subscribing message adapter 510B of the loss of service.

Responsive to receiving notification of a communications fault in the message router 515A, the message topic server 525 can remove the message router 515A from a table of message routers with whom the message topic server 525 presently maintains a communications link. Moreover, the message topic server 525 can remove a list of topics which can associate the message router 515A as an available subscription source.

Responsive to detecting a communications fault in the message router 515A, the message adapter 510A can attempt to re-register the message topic with the message router 515A by transmitting a registerTopic message. Assuming that the message router 515A has recovered from whatever failure had caused the communications fault, the message router 515A can receive the registerTopic message from the message adapter 510A and can forward a registerTopic message to the message topic server 525. Upon receiving the registerTopic message, the message topic server 525 can register the message topic as in the case of nominal operations as discussed above and illustrated in FIG. 2.

Concurrently, upon receiving notification that the subscription to the message topic published through the message router 515A has been terminated, the message adapter 510B can attempt to re-subscribe to the message topic by transmitting a subscribeTopic message to the message router 515B. Upon receiving the subscribeTopic message, the message router 515B can forward a subscribeTopic message to the message topic server 525. In response, as in the case of nominal operations, the message topic server 525 can reply to the received subscribeTopic message with a host identification of a message router suitable for providing a subscription to the requested message topic. As shown in the example of FIG. 5, the host identification can identify the message router 515A. In consequence, the message router 515B can re-establish a communications link with the message router 515A through which data messages can be communicated from the message adapter 510A to the message adapter 510B.

FIG. 6 illustrates an exemplary recovery process triggered by the detection of a data publisher terminating a message topic. As shown in the figure, initially both the message adapter 610A and the message adapter 610C can register a message topic with the message topic server 625. However, subsequently, the message adapter 610A, on behalf of a data publisher, can transmit to a corresponding message router 615A an unregisterTopic message indicating an intention to discontinue publishing data messages consonant with the specified message topic.

The message router 615A can, in turn, forward an unregisterTopic message to the message topic server thereby causing the message topic server to remove the message router 615A from the list of message routers able to provide a subscription to the message topic. Additionally, the message router 615A can notify the message router 615B that the message router 615A cannot continue to service a subscription to the message topic. In consequence, only the message router 615C remains able to service subscription requests for the message topic.

Upon detecting the termination of the subscription service on the part of the message router 615A, the message router 615B can forward a terminateTopic message to the message adapter 610B. In response, the message adapter 610B can attempt to re-establish the subscription by transmitting to the message router 615B a subscribeTopic message. In turn, the message router 615B can forward a subscribeTopic message to the message topic server 625. Upon receiving the subscribeTopic message, the message topic server 625 can query the list of message topics in order to identify a message router able to service the subscription request. Although, in the example shown in FIG. 6, the message router 615A has been removed from the list, the message topic server 625 can identify therein the message router 615C as a message router suitable for servicing the subscription request. As a result, in accordance with the message topic subscription process illustrated in FIG. 2, the message router 615B can transmit a subscription request to the message router 615C.

Figure 7:
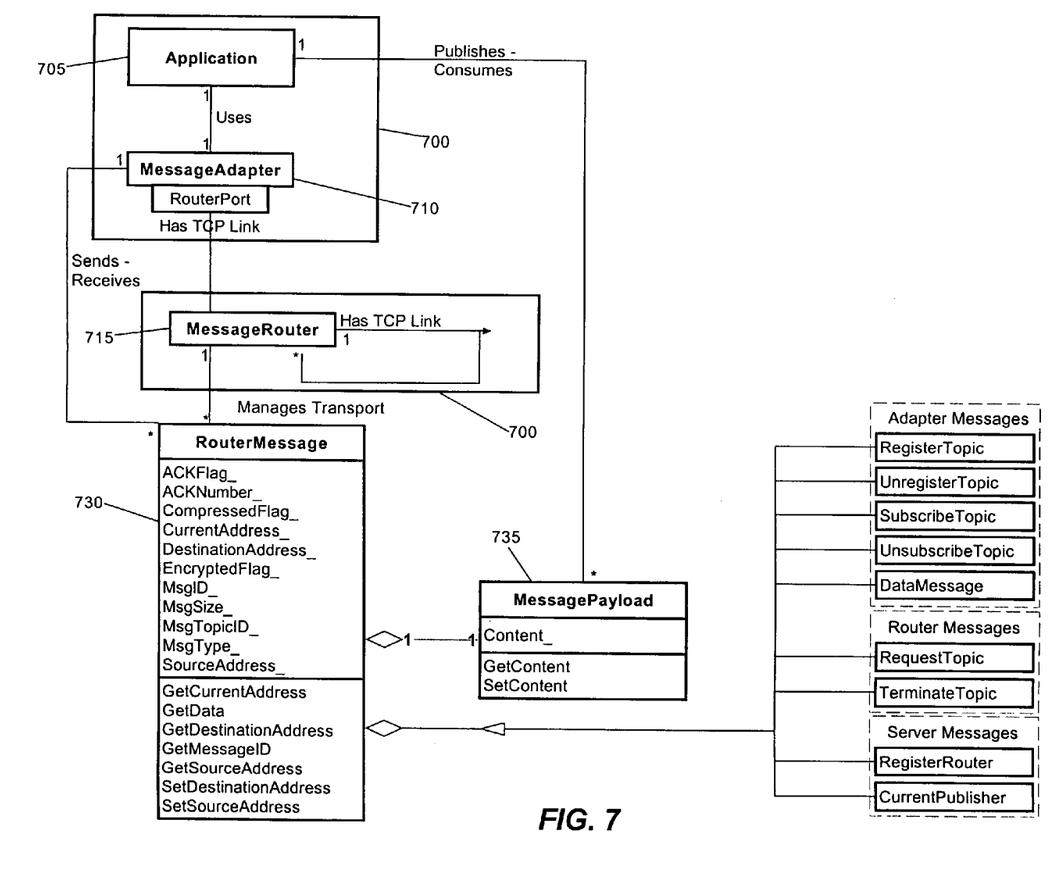
FIG. 7 is an UML object model depicting components and relationships of a client application, message adapter and message router.

The recovery and re-synchronization processes illustrated in FIGS. 4-6 can be facilitated by the architecture of the distributed system of the present invention. An exemplary architecture suitable for use in the present invention is shown in FIG. 7. Specifically, FIG. 7 is a UML diagram illustrating the structure of an application 705 and corresponding message adapter 710 residing in a computing device 700. As shown in the figure, the application 705 can publish or consume data in the form of content. The content itself can include adapter messages, router messages and server messages and can be encapsulated in a message payload 735. Moreover, the content can be accessed through exposed methods.

The message adapter 710 can establish a communications link to a message router 715. As shown in the figure, the message router can establish and maintain communications links to multiple message routers. Additionally, the message router 715 can create and process multiple router messages 730. Each router message 730 can include content and transport data including a current address, destination address, and a source address. Additionally, each router message 730 can have an association with a message payload 735. As such, each router message can expose methods for accessing not only the current, destination and source address, but also the data contained in an associated message payload 735.

Figure 8:
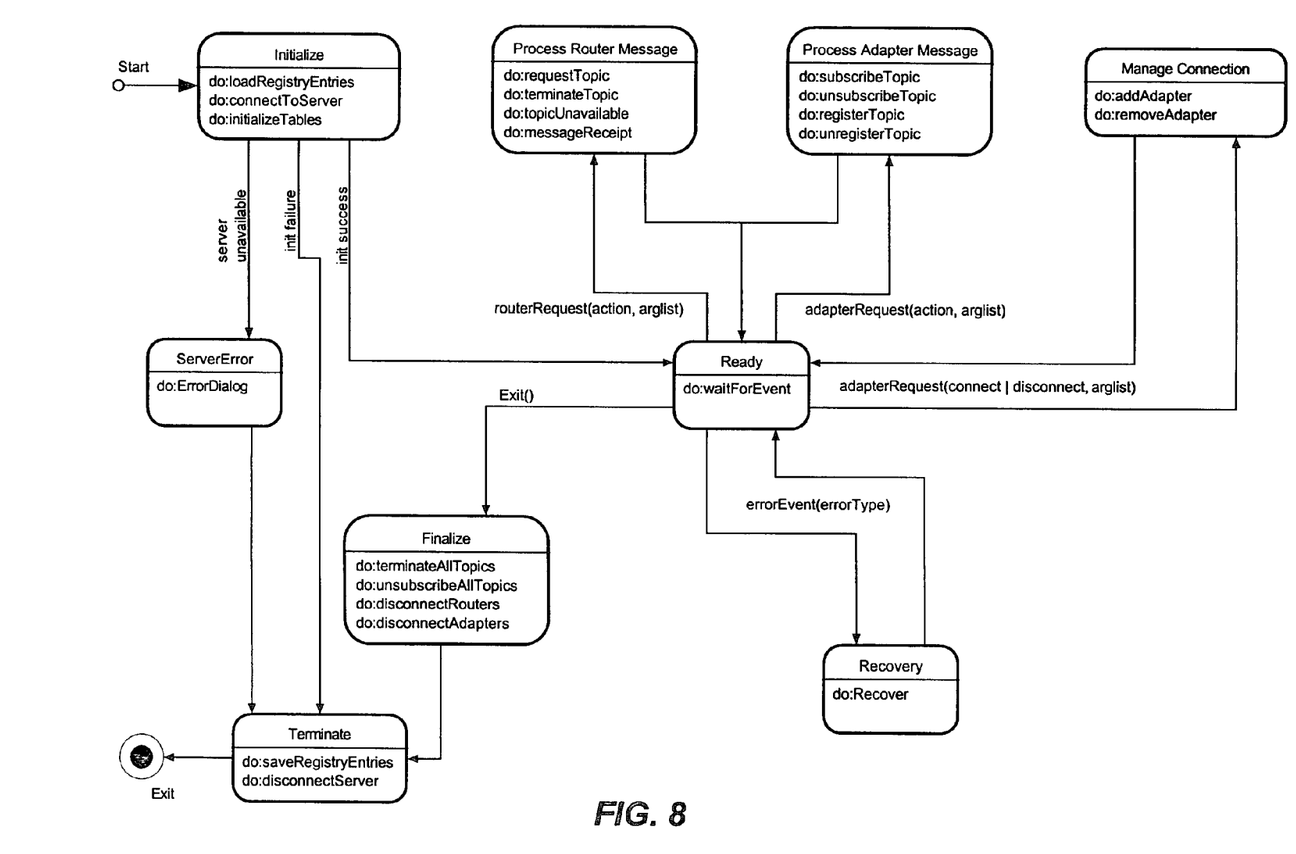
FIG. 8 is a state transition diagram illustrating the operational states of a message router.
Figure 9:
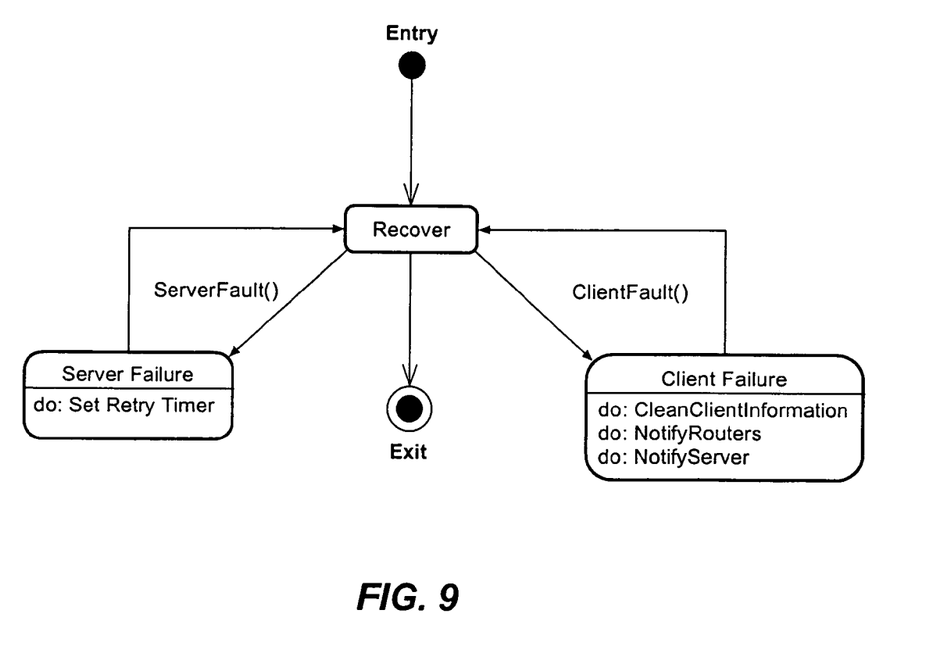
FIG. 9 is a state transition diagram illustrating error recovery paths for the message router.

FIG. 8 is a state diagram depicting events received and processed in a message router and the state transitions flowing from those events. As will be apparent to one skilled in the art, the message router can respond to both messages from communicatively linked message adapters and other communicatively linked message routers. Significantly, the message adapter can detect error events, for example communication faults, and in response can initiate suitable recovery processes such as those illustrated in FIGS. 4-6. Specifically, as shown in the state diagram of FIG. 9, the message router can perform error recovery first by determining whether the fault originated through in a message adapter or a message topic server.

Thus, by virtue of the architecture of the present invention, the system and method of the present invention can re-synchronize interprocess communications between data publishers and data consumers in a distributed messaging system. Notably, the present invention can be realized in hardware, software, or a combination of hardware and software. Machine readable storage according to the present invention can be realized in a centralized fashion in one computer system, or in a distributed fashion where different elements are spread across several interconnected computer systems. Any kind of computer system or other apparatus adapted for carrying out the methods described herein is acceptable.

A typical combination of hardware and software could be a general purpose computer system with a computer program that, when being loaded and executed, controls the computer system such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools.

The invention claimed is:

1. A distributed messaging method for publishing topical data messages in a communications network comprising:

receiving in a first message router from a data consumer a request to subscribe to a message topic;

responsive to receiving said subscription request, retrieving from a message topic server a location of a second message router communicatively linked to a data publisher able to provide data messages consonant with said requested message topic;

sharing state memory among at least said message topic server, said first message router and said second message router to store both message traffic data and network configuration data;

establishing an interprocess communications connection between said first and second message routers;

detecting a communications interruption in at least one of said first message router, said second message router, said data consumer, and said message topic server, re-synchronizing said interprocess communications connection from said shared state memory, said re-synchronizing including terminating said subscription, retrieving from said message topic server a location of any message router communicatively linked to any data publisher able to resume said providing of said data messages consonant with said requested message topic, and establishing an interprocess communications connection between said first message router and said any message router communicatively linked to said any data publisher able to resume said providing of said data messages; and resuming a transmission of said data messages from said data publisher, to said data consumer, after said interprocess communication connection has been resynchronized using said interprocess communications connection between said first message router and said any message router communicatively linked to said any data publisher able to resume said providing of said data messages.

2. The method of claim 1, wherein said step of establishing an interprocess communications connection comprises establishing a multicast data communications link between said first and second message routers.

3. The method of claim 2, wherein said transmitting step comprises multicasting data messages from said data publisher over said multicast data communications link to said data consumer.

4. The method of claim 1, wherein said detecting step comprises:
   detecting a communications break between said data publisher and said second router.

5. The method of claim 1, wherein said detecting step Comprises:
   detecting a communications break between said first and second routers.

6. The method of claim 1, wherein said detecting step comprises:
   detecting said data publisher terminating publication of said requested message topic.

7. The method of claim 1, wherein said step of establishing an interprocess communications connection between said first message router and said message router communicatively linked to said any data publisher able to resume said providing of said data messages comprises re-establishing an interprocess communications connection between said first and second message routers.

8. A machine readable storage medium, having stored thereon a computer program for publishing topical data messages in a communications network, said computer program having a plurality of code sections executable by a machine for causing the machine to perform the steps of:

receiving in a first message router from a data consumer a request to subscribe to a message topic;

responsive to receiving said subscription request, retrieving from a message topic server a location of a second message router communicatively linked to a data publisher able to provide data messages consonant with said requested message topic;

sharing state memory among at least said message topic server, said first message router and said second message router to store both message traffic data and network configuration data;

establishing an interprocess communications connection between said first and second message routers;

detecting a communications interruption in at least one of said first message router, said second message router, said data consumer, and said message topic server, re-synchronizing said interprocess communications connection from said shared state memory, said re-synchronizing including terminating said subscription, retrieving from said message topic server a location of any message router communicatively linked to any data publisher able to resume said providing of said data messages consonant with said requested message topic, and establishing an interprocess communications connection between said first message router and said any message router communicatively linked to any data publisher able to resume said providing of said data messages; and resuming said transmission of said data messages from said data publisher, to said data consumer, after said interprocess communication connection has been re-synchronized using said interprocess communications connection between said first message router and said any message router communicatively linked to said any data publisher able to resume said providing of said data messages.

9. The machine readable storage of claim 8, wherein said step of establishing an interprocess communications connection comprises establishing a multicast data communications link between said first and second message routers.

10. The machine readable storage of claim 9, wherein said transmitting step comprises multicasting data messages from said data publisher over said multicast data communications link to said data consumer.

11. The machine readable storage of claim 8, wherein said detecting step comprises:
   detecting a communications break between said data publisher and said second router.

12. The machine readable storage of claim 8, wherein said detecting step comprises:
   detecting a communications break between said first and second routers.

13. The machine readable storage of claim 8, wherein said detecting step comprises:
   detecting said data publisher terminating publication of said requested message topic.

14. The machine readable storage of claim 8 wherein said step of establishing an interprocess communications connection between said first message router and said message router communicatively linked to said any data publisher able to resume said providing of said data messages comprises reestablishing an interprocess communications connection between said first and second message routers.

15. A distributed messaging system for transmitting topical data messages from data publishers to data consumers comprising:
- a message topic server;
- a first message router;
- a second message router;
- a data consumer communicatively linked with said first message router;
- a data publisher communicatively linked with said second message router;
- said first message router receiving from said data consumer a request to subscribe to a message topic and, responsive to receiving said subscription request, retrieving from said message topic server a location of said second message router;
- wherein state memory is shared among at least said message topic server, said first message router and said second message router to store both message traffic data and network configuration data, an interprocess communications connection is established between said first message router and said second message router, data messages are transmitted from said data publisher over said interprocess communications connection to said data consumer, and responsive to a communication fault in at least one of said first message router, said second message router, said data consumer, and said message topic server, said interprocess communications connection is re-synchronized from said shared state memory;
- wherein said interprocess communication connection is re-synchronized by terminating said subscription, retrieving from said message topic server a location of any message router communicatively linked to any data publisher able to resume said providing of said data messages consonant with said requested message topic, and establishing an interprocess communications connection between said first message router and said any message router communicatively linked to any data publisher able to resume said providing of said data messages; and
- wherein said distributed messaging system resumes a transmission of said data messages from said data publisher, to said data consumer, after said interprocess communication connection has been re-synchronized using said interprocess communications connection between said first message router and said any message router communicatively linked to said any data publisher able to resume said providing of said data messages.

* * * * *

UNITED STATES PATENT AND TRADEMARK OFFICE
CERTIFICATE OF CORRECTION

| | | |
|---|---|---|
| PATENT NO. | : 7,020,717 B1 | Page 1 of 1 |
| APPLICATION NO. | : 09/677072 | |
| DATED | : March 28, 2006 | |
| INVENTOR(S) | : Kovarik et al. | |

It is certified that error appears in the above-identified patent and that said Letters Patent is hereby corrected as shown below:

On the Title Page (75) after "Eric Held", delete "Melbourne" and replace with --Palm Bay--.

Signed and Sealed this

Ninth Day of October, 2007

JON W. DUDAS
*Director of the United States Patent and Trademark Office*